June 10, 1930.　　I. R. METCALF ET AL　　1,762,235
WIRE STITCHER HEAD
Filed Oct. 24, 1928　　7 Sheets-Sheet 7

Inventors
Irving R. Metcalf
George L. Richardson
John Wolf
John P. Smith Atty.

Patented June 10, 1930

1,762,235

UNITED STATES PATENT OFFICE

IRVING R. METCALF, GEORGE L. RICHARDSON, AND JOHN WOLF, OF CHICAGO, ILLINOIS, ASSIGNORS TO LATHAM MACHINERY COMPANY, A CORPORATION OF ILLINOIS

WIRE-STITCHER HEAD

Application filed October 24, 1928. Serial No. 314,618.

The present invention relates to a novel and improved form of a narrow type of wire stitcher head for the forming and driving of wire staples.

One of the objects of the present invention is to provide a novel and improved form of a wire stitcher head mechanism which is simple and compact in construction and in a narrow form so that a great number of these heads may be mounted in the machine for stapling a plurality of staples at one time and in which an individual head may be quickly detached from or mounted in the machine.

Another object of the invention is to provide a stapling mechanism in which the wire is fed to the stapling mechanism parallel to and on one side of the staple former and driver and in which the feeding operation of the wire is accomplished on the up stroke of the staple forming and driving mechanism.

A further object of the invention is to provide in combination with my improved form of staple forming and driving mechanism, a novel and improved form of wire straightening device.

A further object of the invention is to provide a novel and improved wire feeding mechanism of the roller type which permits an adjustment of the rollers thereof, so that various lengths of wire may be fed to the staple forming and driving mechanism.

A further object of the invention is to provide a novel and improved wire stitching mechanism in which the cutter block may be adjusted with respect to the anvil for varying the length of one of the legs of the staple in co-operation with the adjustment of the length of wire fed by the feeding mechanism.

A further object of the invention is to provide a novel and improved form of anvil over which the wire is bent to form the staples and in which the wire is automatically clamped therein so that various sizes of wire within certain limits may be used with my improved form of stitching head.

A still further object of the invention is to provide a novel construction of a stitching mechanism in which the upward stroke of the staple forming and driving mechanism is utilized to feed the wire downwardly to the anvil and sever the same prior to the downward stroke of forming and driving the staple.

These and other objects are accomplished by providing a construction and arrangement of the various parts in the manner hereinafter described and particularly pointed out in the appended claims.

Referring to the drawings.

Figure 1:
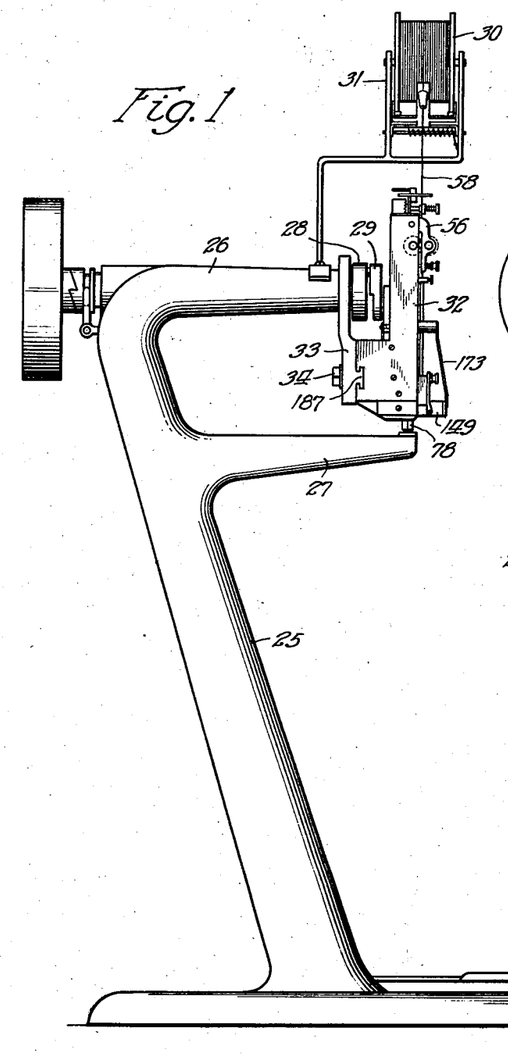
Fig. 1 is a side elevational view of a conventional form of stitching machine showing my improved form of stitcher head formed thereon.
Figure 2:
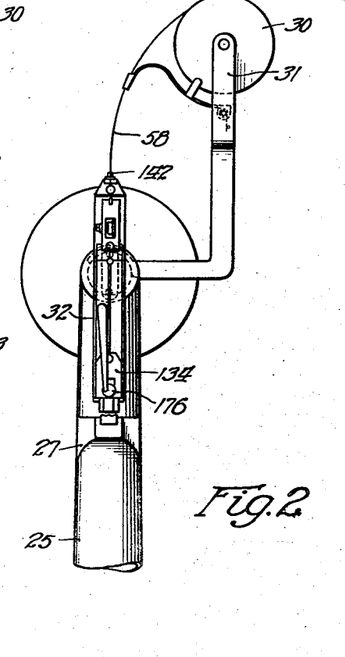
Fig. 2 is a fragmentary front elevational view of the machine shown in Fig. 1.

The stitcher head here shown and described is of the narrow type and is adapted to be mounted on a conventional form of stitching machine in which one or more of these heads are required for stapling books, pamphlets and the like but for the purpose of illustration, I have shown a conventional type of stitching machine generally indicated by the reference character 25, which in turn, is provided with the usual horizontal arm 26 and work supporting arm 27. Mounted in the arm 26 is a shaft (not shown) to which is secured at one end, a crank 28 which by means of a pitman connection 29 is operatively connected to the operating mechanism of the stitcher head in the manner hereinafter described. The wire is fed from a spool 30 journaled in a bracket 31, secured to the arm 26 in any well known manner. The stitcher head generally indicated at 32 is secured to a vertically disposed bracket 33 by means of a bolt 34. The bracket 33 is secured to the arm 26 in any well known manner. The stitcher head 32 comprises an elongated stitcher head frame 35 which is suitably recessed through the longitudinal length for the accommodation of the wire stitching mechanism hereinafter described.

Wire feeding mechanism

Figure 18:
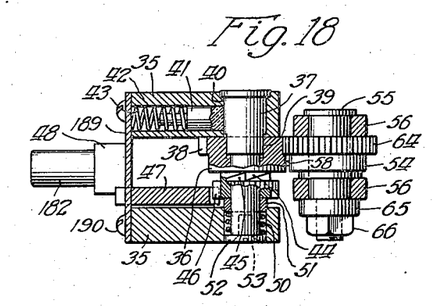
Fig. 18 is a cross-sectional view taken on the line 18—18 in Fig. 3, showing the wire feeding mechanism.
Figure 19:
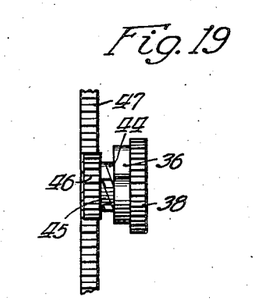
Fig. 19 is a detailed view showing the clutch rack and gear mechanism for driving the wire feed rollers.
Figure 20:
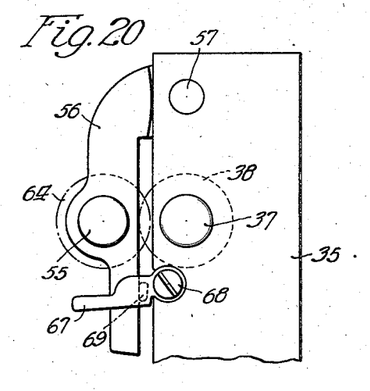
Fig. 20 is a detailed fragmentary side elevational view of the wire feed rolls and an eccentric lock for holding the rolls out of wire feeding position.

The wire feeding mechanism is of the roller feed type in which the feed rollers, or rather the wire engaging portions thereof, projects beyond the normal periphery of the rollers for impinging the wire therebetween for feeding the wire to the staple forming and driving mechanism. One of the important features of the present invention consists in an arrangement in which the wire is fed to the staple forming and driving mechanism by the return or upward movement of the staple former and driver. This wire feeding mechanism comprising a primary wire feeding roll 36 which is secured to a pin 37. Formed integrally with the roll 36 is a spur gear 38. The roller 36 and gear 38 is secured to the pin 37 by means of the pin being provided with flat portions as shown at 39 which in turn, is adapted to be mounted in a corresponding irregular aperture in the gear and roller. The pin 37 is rotatably mounted in an aperture 40 formed in the stitcher frame 35 and the rotation of which is frictionally retarded by means of a pressure pin 41 mounted in an aperture 42 formed in the frame 35. The pressure pin contacts with the peripheral surface of the pin 37 and is pressed into engagement therewith by a pressure spring 43. Formed on one side of the roller and concentrically arranged with respect thereto, are ratchet teeth 44 which are adapted to be engaged by corresponding ratchet teeth 45 formed integrally with a pinion 46. The pinion 46 and ratchet teeth 45 are journaled on the reduced portion of the pin 37. The pinion 46 meshes with and is operatively driven by a reciprocating rack bar 47 which is secured to the reciprocating driving block 48 by means of screws 49. The ratchet teeth 45 are normally urged into engagement with the ratchet 44 by means of a spring 50 which contacts with a ring 51 which in turn contacts with the pinion 46 and ratchet 45. This spring is held in position by means of a washer 52 and set screw 53. From the above description, it will be noted that on the upward stroke of the rack 37 or on the return of the staple former and the driver to its uppermost position, the rack urges the pinion 45 in a direction to revolve the ratchet 44 and feed roller 36 to feed the wire downwardly and on the downward stroke of the rack bar 37 the ratchet 45 will slip by, compressing the spring 50 without disturbing the rotation of the feed roll 36. On the downward stroke of the ratchet, it will be noted that the pressure pin 41 resists or frictionally locks the pin 37 from rotating in the reversed direction. Co-operating with the feed roll 36 is a co-acting feed roll 54 which is journaled on the pin 55 mounted in a pivoted bracket 56. The bracket 56 is pivoted to the frame 35 by means of a pin 57. Each of the wire feed rollers 36 and 54 are provided with co-acting wire camming projecting portions 36' and 54' respectively, which impinge the wire 58 therebetween for feeding it to the staple forming and driving mechanism in the manner hereinafter described. The free end of the bracket 56 is normally spring pressed inwardly by means of spring 59 which in turn, is mounted on a threaded pin 60 which has one end pivoted to the frame 35 as shown at 61 and the other end provided with a thumb nut as shown at 62. The pin 60 extends through an aperture 63 in the free end of the bracket 56. This adjustment permits various degrees of tension to be placed on the rollers for impinging the wire therebetween. Formed integrally with the roller 54 is a gear 64 which meshes with and is operatively driven by the gear 38. It will be noted that the feed rollers may be adjusted so that various lengths of wire may be fed into the staple forming and driving mechanism by merely changing the position of one of the rolls with respect to the other so that a greater or lesser amount of the camming projecting portions 36' and 54' of the respective rollers contact with each other. The pin 55 is secured in position on the bracket 56 by a washer 65 and nut 66 mounted in threaded engagement with the threaded portion of the pin 55, (see Figs. 3 and 18). The pivoted bracket 56 may be swung outwardly against the tension of the spring 59 by means of a little eccentric lever 67 which is pivoted as shown at 68 to the frame 35. The lever 66 is provided with an inwardly extending projection 69 which is adapted to contact the inner side of the pivoted bracket 66 so that when the lever 67 is actuated upwardly it throws the bracket 56 outwardly from the frame so that the wire may be inserted between the rollers. (See Figs. 18 and 20.)

*Staple forming and driving mechanism*

The staple forming and driving mechanisms are both driven by a single block. They move together to a point where the staple is formed after which an automatic means unlocks the staple former from the staple driver so that the staple driver moves with respect to the staple former for driving the staple into the work. The reciprocating staple former and driver block 48 is provided with laterally projecting and longitudinally extending ribs 70 which are mounted in corresponding grooves 71 formed on the inner recess 72 of the head frame 35. The forward face of the reciprocating block 48 is provided with a forwardly projecting rib 73 beneath which is secured a staple driver 74. The reciprocating driver 74 is provided with a semi-circular recess on the rear side thereof, as shown at 75 which receives therein, a semi-circular projection 76 formed on the forward face of the block 48 below the transverse rib 73 (see Fig. 8). The reciprocating driver 74 is movably mounted in a recess 77 formed in the forward side of the staple former 78. The staple former 78 is provided with two laterally projecting ribs 79 which are mounted in the vertically disposed recesses 71 formed in the stitcher frame 35, (see Fig. 9). Extending vertically through the reciprocating block 48 is a circular bore 80 in which is reciprocally mounted a pin 81. The upper portion of the pin 81 is provided with a circular recess as shown at 82 in which is mounted a compression spring 83. This compression spring 83 is held under a tension by a transverse pin 84 which is mounted in a bore 85 located adjacent the top of the block 48. This pin 84 extends through vertically disposed slots 86 formed in the opposite sides of the vertical pin 81. From the above description, it will be noted that the spring 83 normally presses the pin 81 to its lowermost position with respect to the block 48. The lower end of the pin is provided with a recess as shown at 87 which engages a complementary projection 88 formed on the upper end of the staple former 78. (See Figs. 8, 14 and 15.) The lower end of the pin 81 abuts against a transverse member 89 which is secured to the rear side of the staple former 78 by a set screw 90. On the initial portion of the downward stroke of the staple forming and driving mechanism, both staple former 78 and staple driver 74 move together to a point in which the ends of the wire are formed into a staple, after which the further movement of the staple former ceases and the driver continues further on to drive the staple into the work. The staple former and driver are locked together and operatively driven by the reciprocating block 48 by a locking or clutch pin 91 which is reciprocally mounted in a transverse bore 92 located on the rear side of the block 48. The forward end of the reciprocating pin is adapted to seat itself in a socket 93 formed on the rear side of the reciprocating pin 81. The locking or clutch pin 91 is provided with a transversely extending portion 94 which also, is adapted to move in a horizontal slot 95 formed in the rear side of the block 48. The reciprocating or locking pin 91 is normally pressed inwardly by a spring 96 which is substantially U-shaped in construction and has its opposite ends bent inwardly toward each other and mounted in oppositely disposed relation in the aperture 97 formed in the block 48. An intermediate portion of both legs of the spring 96 engages oppositely disposed pins 98, secured to the opposite sides of the block 48. These pins normally press the free end of the spring inwardly, (see Figs. 3, 14, 15 and 16). The free end portion of the springs are mounted in vertically disposed grooves as shown at 99 formed in the transverse portion 94 of the locking pin 91. The locking pin 91 is disengaged from the recess 93 formed in the reciprocating pin 81 by oppositely disposed camming plates 100 which are secured to the opposite sides in the recess 72 of the frame 35 by means of screws 101. These camming plates are provided with bevelled or camming portions 102 which engage the inwardly curved portions 103 of the transverse portion 94 of the locking pin 91. Pivoted to the staple former on a transverse pin 104 and in a recess 105 in the staple former 78, is a staple supporter 106 which is provided with the usual pointed curved end 107 which is adapted to swing between the bifurcated portions of the staple former beneath the staple driver for supporting the staple during the operation of driving the staple into the work. This staple supporter 106 is normally pressed forwardly into staple supporting position by a curved flat spring 108 which has one end secured to the reciprocating block 48 by a screw 109 and its free end engaging the rear side of the staple supporter. The staple supporter 106 is normally swung out of staple supporting position by a transverse pin 110 extending transversely therethrough and adapted to engage the camming surfaces 111 formed on the lower end of the camming plates 100.

*Wire cutting mechanism*

The wire cutting mechanism comprises a cutter block 112 which is secured in any well known manner to a front plate 113 which in turn is seated in a suitable recess 114 formed on the front face of and extends longitudinally on both sides of the stitcher head frame 35. The cutter block 112 is vertically adjustable with respect to the anvil hereinafter described by means of a thumb nut 115 which has its threaded portion as shown at 116 mounted in threaded engagement with a threaded bore 117 formed in the upper end of the cutter block 112. Extending vertically and longitudinally through the cutter block is an aperture 118 through which the wire 58 is fed. Located transversely of and at the lower side of the cutter block 112 is a horizontal rectangular recess 119 in which is reciprocally mounted, a cutter knife 120. The cutter knife 120 is provided with a cutting edge 121 (see Figs. 7, 8 and 9), which is adapted to move transversely of the aperture 118 in the cutter block, for severing the wire. The cutter knife 120 is reciprocally actuated by a pivoted lever 122 which is pivoted on a pin 123 mounted in the cutter block 112 in any well known manner. This reciprocating lever 122 is mounted in a substantially semi-circular recess 124 formed in the cutter block and has its free end or downwardly projecting arm as shown at 125 mounted in a recess 126 formed in the reciprocating knife 120. One side of the pivoted lever 122 is provided with camming projections 127 and 128 which are adapted to be actuated by a forwardly extending projection 129 formed on a reciprocating bar 130. The reciprocating bar 130 is slidably mounted in a recess 131 formed between one edge of the staple former 78 and the side of the frame 35. (See Fig. 16.) On the upward stroke of the reciprocating bar 120, the forwardly extending projection 129 engages the cam 127 of the lever 122 so as to operate the free end 125 in a direction to the right (see Fig. 7), so that the cutter knife 120 is reciprocated in the same direction for severing the wire. The upper end of the reciprocating bar 113 is provided with an inwardly projecting extension 131 which is adapted to engage a forwardly projecting transverse rib 132 formed on the forward face of the reciprocating block 48. The cutter knife 120 is returned to its home or normal position or at a position shown in Fig. 7, on the downward stroke of the reciprocating bar 130, by the forwardly projecting lug 129 of the bar, engaging the camming projection 128 of the lever 122. This return movement is imparted to the bar 130 by an inwardly projecting lug 133 which is located in the path of movement of the forwardly projecting transverse rib 132 of the reciprocating block 48. If it is desired to lengthen the legs of the staple, the feed rolls, or rather, the wire engaging projections thereof, are adjusted with respect to each other so as to vary the length of the wire fed to the anvil. This adjustment, of course, lengthens one end of the wire extending beyond the lower side of the anvil and to lengthen the other wire extending above the longitudinal center of the anvil before the wire is turned to its horizontal position, the cutter box 112 may be moved upwardly so that the length of the wire severed is either increased or diminished to correspond with the length of wire projecting below the center of the anvil. This adjustment is made by unscrewing the thumb screw 115 and adjusting the cutter box upwardly then clamping the thumb screw 115 to the pivoted member 134 which is pivoted at 135 to the anvil supporting frame 136. This anvil supporting frame 136, in turn, is secured by means of screws 137 in suitable recesses 138 formed in the outside of the frame 35. The wire is fed from the spool 30 through a wire straightening device 139 which is provided with an aperture 140 through which the wire passes. This straightening device is provided with a longitudinal extending slot 141 which slidingly receives a clamping screw 142. From this straightening device, the wire is passed through a tension device which comprises two oppositely disposed discs 143, spring 144 and adjusting thumb screw 145 which varies the tension of the springs to exert spring tension between the discs 143, between which the wire passes. From here the wire passes through a guide tube 146 which in turn, is clamped to the plate 113 by means of a thumb screw 147. From this point, the wire passes through the tube 118 in the cutter block 112 in the manner previously described.

Staple forming anvil

Figure 17:
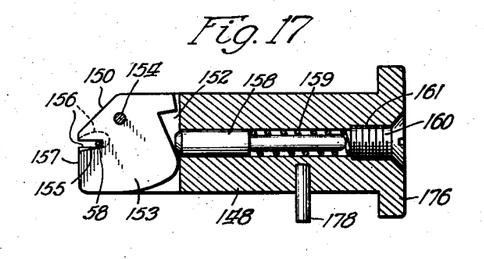
Fig. 17 is an enlarged cross-sectional view taken on the longitudinal axis of the anvil.

Another feature of the present invention is the provision of a novel form of anvil which is adapted to accommodate various sizes of wires and clamp and support the same therein, regardless of the size of the wire within certain limitations. This construction comprises a reciprocable and rotatable anvil 148 which is substantially cylindrical in form and is rotatably and reciprocally mounted in a cylinder barrel 149 formed integrally with the anvil supporting member 136, (see Figs. 3, 8 and 17). The inward portion of the anvil is provided with a tapered end 150 which is adapted to move in between the legs of the staple former 78 and be engaged by the tapered portion 151 formed on the forward side of the staple driver 74 for moving the anvil outwardly with respect to the frame in the operation of driving the staple. Mounted in a transverse slot 152 on the inward end of the anvil 148 is a pivoted clamping member 153 which is pivoted on pin 154 extending transversely through the anvil. The inward end of the clamping member 153 is provided with a slot 155 which substantially coincides with a longitudinally extending slot 156 formed in the anvil 148 proper, when the clamping member is in its non-clamping position. These slots substantially coincide with each other for receiving the wire 58 therein, when the edge 157 of the clamping member 153 contacts with the front surface of the driver 74. The wire is normally clamped between these slots by the action of a reciprocating pin 156 which is pressed in the direction of the clamping member 153 by a compression spring 159. The compression spring 159 is held under spring tension by a threaded screw 160 which is mounted in a threaded bore 161 located in the outer end of the anvil 148. (See Fig. 17.) When the anvil is in its normal wire receiving position or a position in which the slots 55 and 56 are vertically disposed for receiving the wire 58 therein, the clamping member 153 is in the position shown in Fig. 7, in which position the clamping member is forced by the outer edge 157 of the clamping member 153 contacting with the outer surface of the staple driver 74 as clearly shown in Fig. 15.

Figure 7:
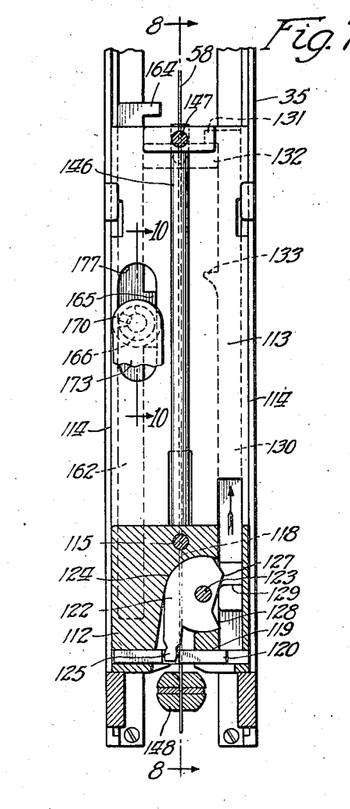
Fig. 7 is a fragmentary cross-sectional view taken on the lines 7—7 in Fig. 8, showing the construction and operation of the cutting mechanism.
Figure 8:
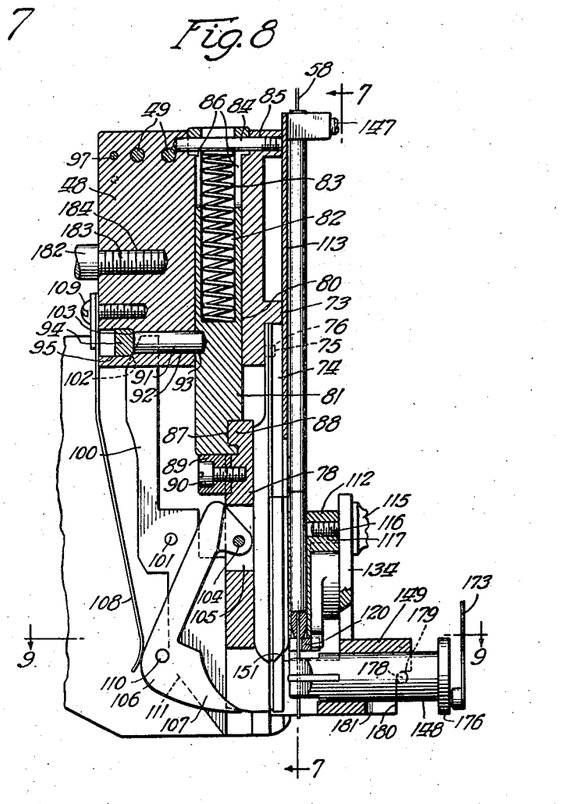
Fig. 8 is a fragmentary cross-sectional view taken on the line 8—8 in Fig. 7.
Figures 9, 10:
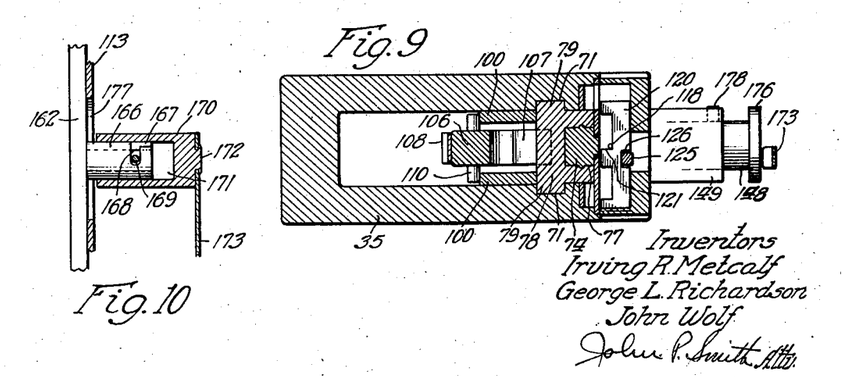
Fig. 9 is a cross-sectional view taken on the line 9—9 in Fig. 8.
Fig. 10 is a fragmentary cross-sectional view taken on the line 10—10 in Fig. 7.
Figure 11:
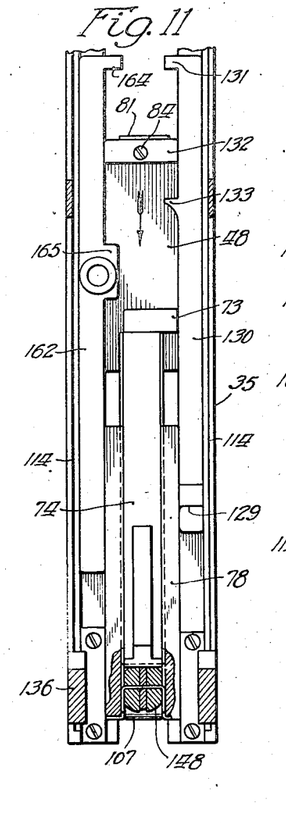
Fig. 11 is a fragmentary front elevational view with portions of the stitcher head removed showing the position of the staple former and driver at the completion of the forming of the staple.
Figure 13:
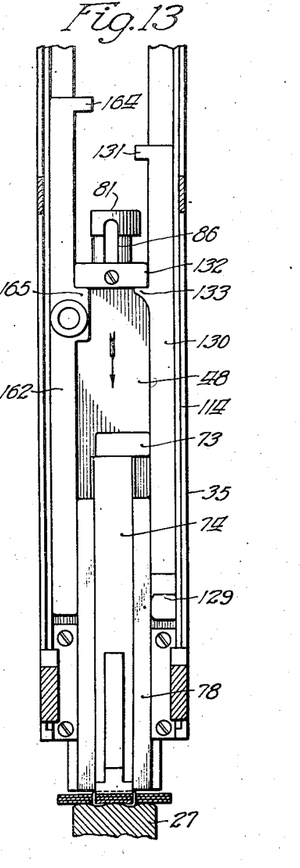
Fig. 13 is a similar view showing the completion or clinching of the staple in the work.
Figures 14, 15:
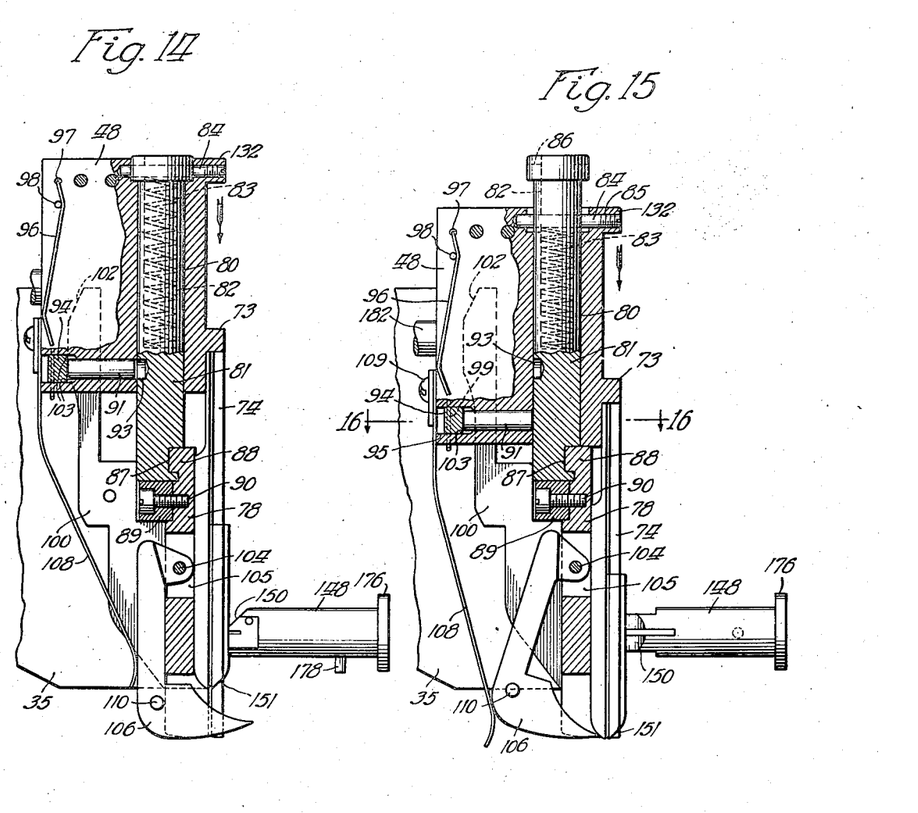
Fig. 14 is a fragmentary, cross-sectional view showing the position of the stapling mechanism parts after the wire has been cut and the anvil turned to its horizontal position.
Fig. 15 is a fragmentary side elevational view showing the position of the various parts of the stapling mechanism at the conclusion of driving the staple into the work.
Figure 16:
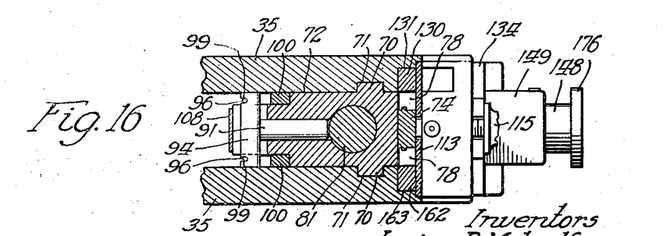
Fig. 16 is a cross-sectional view taken on the line 16—16 in Fig. 15.
Figure 21:
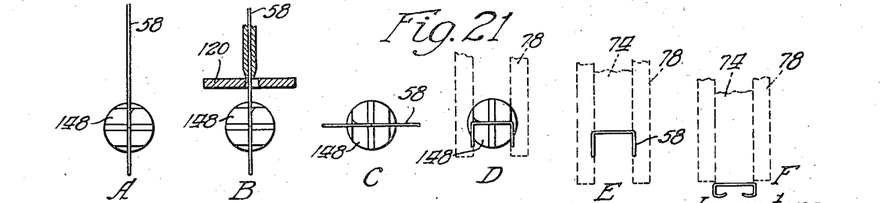
Fig. 21 shows diagrammatic views designated as "A," showing the position in which the anvil receives the wire; "B", showing the position in which the cutter knife is about to sever the wire; "C", the position in which the anvil is revolved so the wire assumes a horizontal position; "D", the position in which the former forms a staple over the anvil; "E", the position in which the driver contacts with the staple just prior to driving the staple into the work, and "F", showing the position of the staple former and driver at the conclusion of clinching the staple into the work.

The anvil is rotated from its wire receiving position as shown in Figs. 7 and 8 to a position in which the wire is held horizontally for being formed in the form of a staple or for a position shown at "C", Fig. 21. By the action of a reciprocating bar 162 which is mounted in a recess 163 formed between the head frame 35 and the staple former 78 opposite the reciprocating bar 130. The upper end of the reciprocating bar 130 is provided with an inwardly projecting lug 164 which is located in the path of the transverse rib 132 formed on the front face of the reciprocating block 48. Projecting inwardly from the bar 162 and located midway or centrally of the bar thereof, is a second projecting lug 165 which is also located in the path of the transverse rib 132 of the reciprocating block 48 and is adapted to be engaged thereby for moving the bar downwardly for the purpose hereinafter described. Formed integrally with or secured to the bar 162 adjacent the lug 165, is a forwardly projecting hollow tubular member 166. The outer end of the hollow tubular member 166 is provided with a longitudinal slot 167 which communicates with the transverse slot 168 together forming substantially a keyhole slot which is adapted to receive in engagement therewith a projecting pin 169 secured to one side of the sleeve or collar 170. The sleeve or collar 170 is provided with a circular recess 171 which telescopically receives the tubular member 166 (see Figs. 7 and 10). Secured to the forward end of the sleeve 170 by having a portion thereof riveted over as shown at 172, is a spring connecting bar 173 which is provided on its lower end with an inwardly extending pin 174 which is adapted to seat itself in a circular recess 175 located eccentrically of the longitudinal center of the enlarged circular portion 176 of the anvil 148. The tubular member 166 extends through an elongated slot 177 formed in the front plate 113. From the above description it will be seen that at the end of the down stroke of the staple former and driver, the transverse rib 132 of the reciprocating block 48 engages the projection 165 of the reciprocating bar 162 as shown in Fig. 13, which movement actuates or rotates the anvil to the position as shown in Fig. 15. The anvil is held rigidly in the position shown in Fig. 8 by an outwardly projecting pin 178 secured to the anvil in any well known manner. This pin engages a stop 179 formed by a peripheral recess 180 cut in the cylindrical barrel or anvil supporting member 149. At this point it will be noted that clamping member 153 contacts with the driver 74 so that the respective slots of the anvil and clamping member are in alignment, after the wire is fed into the slots 55 and 56 at the inward end of the anvil by the upward stroke of the staple former and driver, the severing mechanism is brought into operation to sever the wire as previously described. It will also be noted that on the upward stroke of the staple former and driver that the transverse rib 132 of the reciprocating block 148 engages the projection 164 formed on the reciprocating bar 162 and through the spring connection 173 with the bar 162, the anvil is rotated to the position shown in Fig. 3 and pressed inwardly by the action of the spring 173 so that the pin 178 is seated in the base of a longitudinal slot 181 formed in the lower side of the barrel 149, thus locking the anvil rigidly, and in a manner in which the ends of the wires projecting equal distances on both sides of the anvil as shown at "C", Fig. 21, preparatory to forming the wire into a staple as shown at "D" Fig. 21. The reciprocating block 48 is provided with a rearwardly projecting pin 182 which in turn has a reduced portion 183 mounted in a threaded aperture 184 formed in the block 48. This pin may be operatively connected to the connecting rod 29 for reciprocating the block and driving the staple forming and driving mechanism. The head 35 is provided with a rear transverse and vertically disposed wall 185 which in turn, is provided with a centrally disposed transverse T-shaped groove 186, which in turn, is adapted to receive a complementary transverse T-supporting rib 187 secured to the bracket 33. The stationary head frame 35 is secured thereon by the nut 34 which enters the threaded bore 188 formed in the vertically disposed wall 185 of the head or frame 35. The rack bar 47 is held in operative relation with the pinion 46 by means of a rear transverse plate 189 which is secured in position by bolts 190 to the upper end of the stationary head frame 35.

Figure 3:
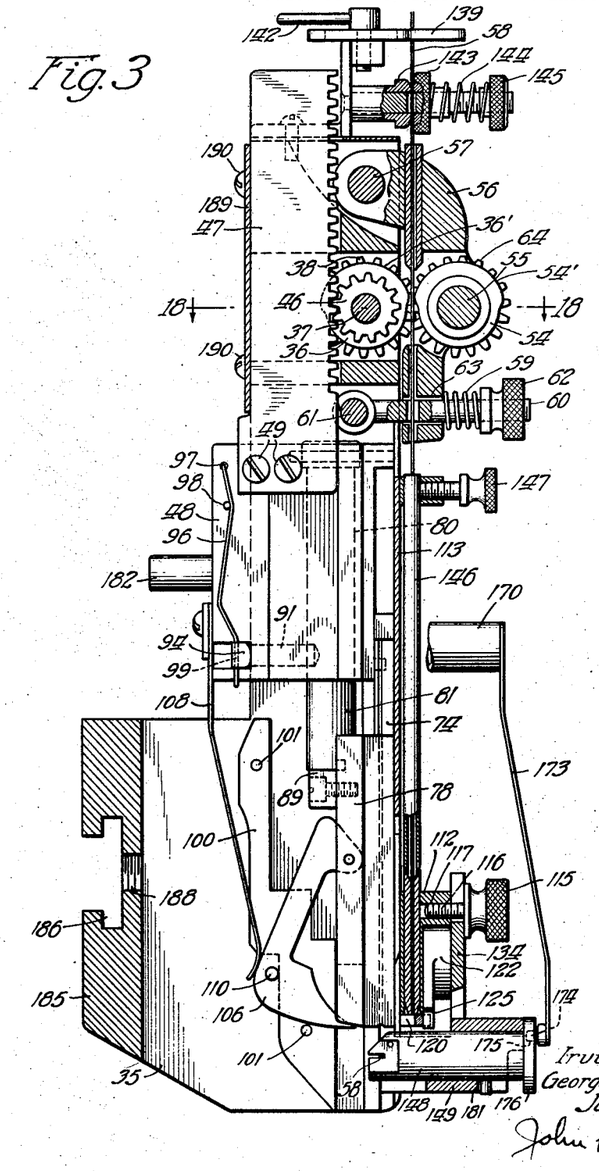
Fig. 3 is a longitudinal cross-sectional view showing the construction of my improved form of narrow stitcher head.
Figure 4:
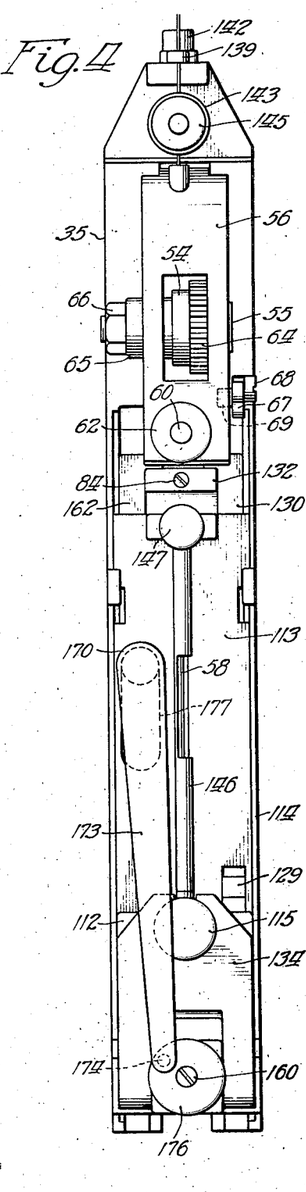
Fig. 4 is a front elevational view of the stitcher head shown in Fig. 3.
Figure 5:
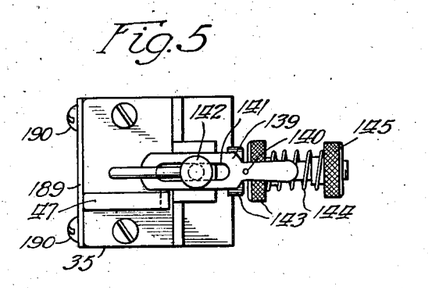
Fig. 5 is a top plan view of a stitcher head.
Figure 6:
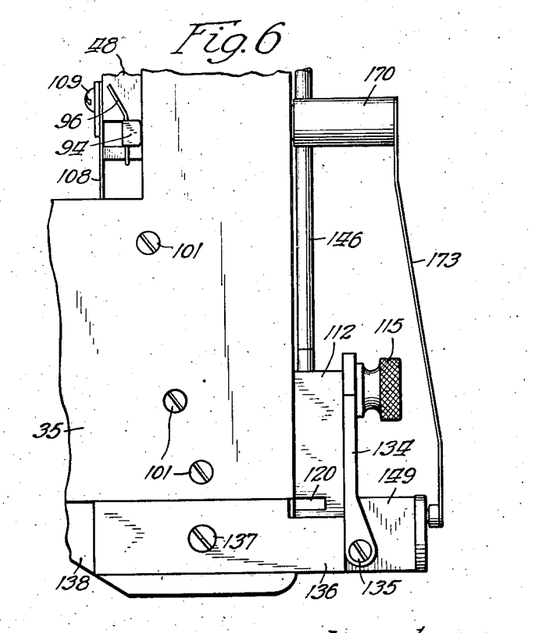
Fig. 6 is an enlarged fragmentary view of a side of the stitcher head showing the connection which operatively revolves the anvil for turning the wire from a vertical position to a horizontal position.
Figure 12:
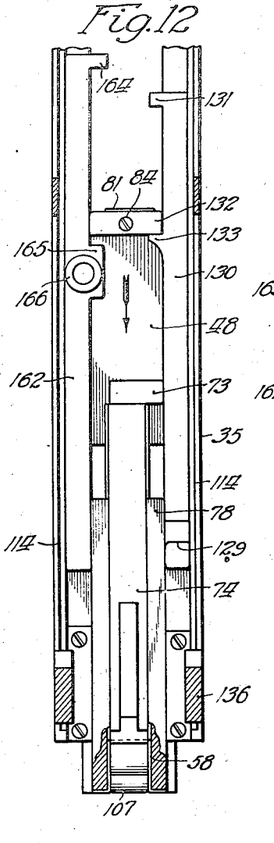
Fig. 12 is a similar view showing the staple forming and driving mechanism in position where the driver is in the operation of driving the staple into the work.

The operation of our improved wire stitching head mechanism is as follows:

Let us assume that all the operative parts of the stitcher head are in the position shown in Fig. 3 in which a cut off length of wire is in the staple former 148 and in which the staple former is in the position shown in this figure, which is the same position as is shown in "C" Fig. 21 and that the operation of the machine through the pitman connection 29 moves the pin 182 and the block 48 downwardly, thereby forcing the staple former 78 downwardly so as to form the ends of the wire into a staple as shown at "D" Fig. 21. When the reciprocating block reaches a position on its downward movement so that the transverse portion 94 of the locking pin 91 engages the beveled camming surfaces 102 of each of the camming plates 100, the pin 102 is withdrawn against the action of the spring 96 from the circular recess 93 formed on the rear side of the reciprocating pin 81, thereby disconnecting the reciprocating block 48 from the staple former 78 and on a further movement of the block 48 downwardly, the staple driver 74 moves downwardly by reason of the same being rigidly connected to the reciprocating block through the interlocking rib 76. At the conclusion of the downward stroke of the driver 74, the staple is clinched into the work as shown at "F", Fig. 21. It will, of course, be understood that during the operation of the former in forming the staple over the anvil, that the staple supporting member 106 is actuated between the legs of the staple former by the action of the pressure spring 108 and its operation is controlled by the camming portion 111 of the camming plate 100 so that the staple is supported in proper position by the former and contact with the staple driver which forces the staple former out of staple supporting position on its downward movement in a manner well understood in the art. It will, also, be understood that on the downward stroke of the staple driver, the curved pointed surface 151 of the staple driver will engage the beveled surface 150 of the anvil 148 to force the same outwardly against the action of the pressure spring 173 in a manner well understood in the art. But in addition thereto, will actuate the clamping member 153 about its pivot 154 in the anvil so that the slots 155 and 156 of the clamping member 153 and anvil 148, respectively, will coincide or register so that the wire is permitted to enter these slots preparatory to receiving the wire therein. Just subsequently to the operation of forming the staple, as shown in Fig. 12 and "D" of Fig. 21, the transverse rib 132 of the reciprocating block 48 contacts with the inwardly extending lug 133 of the reciprocating bar 130 to actuate this bar downwardly so that the outwardly extending lug 129 contacts with the camming projection 128 of the knife lever 122 to return the knife to its home position or the position shown in Figs. 7 and 9, preparatory to severing the next length of wire for the succeeding staple. Subsequently to this operation the other end of the transverse rib 132 of the reciprocating block 48 contacts with the inwardly extending lug 165 of the reciprocating bar 162 for actuating the anvil and causing the same to rotate to its wire receiving position or the position shown in Figs. 8 and 15 through the connection 173. On the initial portion of the upward or return stroke of the reciprocating block 48, the driver 74 and block, moves relatively to the staple former 78 until the locking pin 91 is released or permitted to be pressed inwardly by the action of the camming surfaces 102 of each of the camming plates 100 until the locking pin 91 again seats itself in the recess 93 formed in the rear side of the reciprocating pin 81. The staple former 78 is normally maintained stationary during a portion of the upward movement of the block 48 by the action of the pressure spring 83 having its upper end engaging transverse pin 84 mounted in the upper end of the block 48 and the other end of the spring normally pressing the pin 81 downwardly in the bottom of the recess 82 formed in the pin. As the block 48 moves upwardly it carries with it the reciprocating rack bar 47, the teeth of which engage and operatively drive the pinion 48 which in turn, through the clutch or ratchet teeth 45 formed integrally with this pinion, engages the ratchet teeth 44 of the feed roll 36 thereby revolving the roll 36. Through the gear 38 and complementary gear 64 the complementary feed roller 54 is driven so as to impinge the wire between the wire feeding camming surfaces 36' and 54', of each of these rollers, respectively. At the conclusion of the feeding operation of these rollers, the transverse bar 32 of the reciprocating block 48 engages the inwardly projecting lug 131 of the reciprocating bar 130 to move said bar upwardly and thereby, cause the forwardly projecting lug 129 to engage the camming projection 127 of the knife lever 122 to actuate the knife 120 to the right when looking at Fig. 7, to sever the wire. On a further movement of the reciprocating block 48 upwardly, the transverse rib 132 contacts with the inwardly extending lug 164 of the reciprocating bar 162 and thereby, actuates the anvil again to a position in which it holds the severed wire horizontally as shown at "C" in Fig. 21. It will, of course, be noted that during the downward movement of the wire by the action of the feed rollers, that the clamping member 153 is held in position so that the slot 55 in this clamping member registers with the slot 56 in the anvil 148 by reason of the inward edge 157 of the clamping member 156 contacting with the outer face of the driver, as clearly shown in Fig. 15, and that just at the conclusion of the wire feeding operation and just prior to the wire severing operation, the driver is withdrawn from the front or inner edge of the anvil so as to permit the reciprocating pin 158 to actuate the clamping member by the spring 159 to clamp the wire between the slots 155 and 156 of the clamping member and anvil respectively, so that the possibility of the severed wire slipping or sliding out of position in the anvil, prior to being formed into a staple, is eliminated.

From the above specification, it will be seen that we have provided a novel and improved form of a narrow stitcher head in which feed rollers are actuated for feeding wire vertically down and parallel to the staple forming and driving mechanism and in which the feeding operation is performed during the upward or return stroke of the staple forming and driving members. It will also, be noted, that we have provided a mechanism in which the severing of the wire is accomplished at substantially the conclusion of the upward or return stroke of the staple forming and driving members and that just prior to the conclusion of the return stroke of these members, the anvil is turned so that the wire is presented in a horizontal position beneath and in the path of the staple former and driver. It will be noted that by dividing the cycle of operations, that is, operating the feed of the wire, the severing of the wire and the positioning of the wire preparatory to forming the staple by the upward or return stroke of the forming and driving members that we have so divided the cycle of operation of these movable parts in such a sequence of operation, that the speed of the staple forming and driving mechanism may be increased to a maximum without necessarily overloading the operating parts of the machine.

While in the above specification we have described one embodiment which our invention may assume in practice, it will, of course, be understood that the same is capable of modification and that modification may be employed without departing from the spirit and scope of our invention as described in the following claims.

What we claim as our invention and desire to secure by Letters Patent is:

1. A wire stitcher comprising a mechanism for feeding wire in the direction of drive, a wire severing means, a staple forming and driving means operatively related to said wire feeding and severing means, and means whereby said wire feeding mechanism is actuated to feed the wire on the return stroke of said staple forming and driving mechanism.

2. A wire stitcher comprising a mechanism for feeding the wire in the direction of drive, a wire severing means, staple forming and driving means, and means for driving said wire feeding mechanism by the return stroke of said staple forming and driving means.

3. A wire stitcher comprising a mechanism for feeding the wire in the direction of drive, a wire severing mechanism, a staple forming and driving mechanism, and means secured to said staple forming and driving mechanism for feeding wire thereto on the return stroke of said staple forming and driving mechanism.

4. A wire stitcher comprising intermittently actuated rollers for feeding wire in the direction of drive, a wire severing means, staple forming and driving means, and means operatively connecting said staple forming and driving means with said rollers for feeding the wire downwardly on the upward stroke of said staple forming and driving mechanism.

5. A staple forming and driving mechanism comprising a frame, intermittently rotatable wire feed rollers mounted on said frame for feeding wire in the direction of drive, and wire severing means mounted on said frame and operatively related to said feeding mechanism and severing means so that on the upward stroke of said staple former and driving means, the wire is fed downwardly and at the conclusion of the feeding of said wire, said severing means is actuated to cut said wire.

6. A staple forming and driving machine comprising a frame, intermittently actuated wire feed rollers mounted on said frame for feeding the wire in the direction of drive, severing means mounted on said frame, a rotary staple forming anvil mounted on said frame, means for turning said anvil, a staple former and driver mounted on said frame and operatively related to said rollers and to said anvil, and means forming a connection between said staple former and driver for feeding the wire downwardly during the upward stroke of said staple former and driver.

7. A wire stitcher head comprising a frame, intermittently rotatable wire feed rollers mounted on said frame for feeding the wire in the direction of drive, means mounted on said frame for severing the wire, a staple former and driver mounted in said frame, and operative means connecting said driver with said feed rollers and connecting said severing means with said staple former and driver, whereby on the upward stroke of said former and driver, the wire is fed downwardly by said feeding rollers and severed at the conclusion of said feeding operation.

8. A wire staple forming and driving machine comprising staple forming and driving devices, a wire feed for feeding the wire beside and near the path of said devices and actuated to feed wire by the return stroke of said devices, and a cutter for severing a piece from the end of the wire to make a staple.

9. A wire staple forming and driving machine comprising staple forming and driving devices, a wire feeding mechanism for advancing the wire beside and near the paths in which said devices are moved, said wire feed mechanism being actuated by the upward movement of said devices, a cutter for severing a piece from the end of said wire to make a staple, and a rotatable staple forming anvil to turn such pieces into transverse position wherein it extends across the path of said devices.

10. A wire staple forming and driving machine comprising staple forming and driving devices, intermittently rotatable rollers for feeding a wire parallel to and at one side of the paths in which said devices are moved, a cutter for severing a piece from the end of the wire to form a staple, and means whereby said feed rollers are actuated by the upward stroke of said devices for feeding the wire downwardly preparatory to severing and forming the severed piece of wire into a staple.

11. A wire stitching machine comprising a relatively narrow frame, wire feeding rollers mounted on said frame for intermittently feeding wire therebetween, reciprocating staple forming and driving devices mounted in said frame, a pinion carried by one of said feed rollers, a reciprocating rack connected with said device and geared to the pinion of one of said feed rollers for actuating said rollers for feeding the wire downwardly on the upward stroke of said devices, wire severing means mounted on said frame and operatively related to said devices for severing the wire at the end of the upward stroke of said device, and a rotatable staple forming anvil operatively connected with said devices for receiving and supporting the severed piece of wire therein for forming the staple.

12. A wire stitcher comprising an intermittently actuated roller feed mechanism for feeding a wire in the direction of drive, means for adjusting said rollers for severing sections of wire of various lengths, staple former and driving devices mounted in said frame and operatively related to said feeding mechanism whereby the wire is fed down on the upward stroke of said devices, and means for turning the severed piece of wire into a position transverse to the feeding direction and locating the same so that the staple may be positioned for driving it into the work.

13. In a wire stitching machine, in combination with intermittently actuated rollers for feeding wire in the direction of drive, a staple former and driver operatively related to said intermittently rotating feed rollers whereby said rollers feed the wire during the non-working stroke of said staple former and driver, a wire cutting knife for severing staple blanks from the end of the wire, and means engageable with said knife and actuated by the upward movement of said staple former and driver for severing the wire into staple blanks.

14. A wire stitching machine comprising a relatively narrow frame, a feeding mechanism mounted on said frame, a staple forming and driving mechanism mounted on said frame and operatively related to said feeding mechanism, whereby on the upward stroke of said staple former and driver, the wire is fed downwardly by said feeding mechanism, a staple forming anvil rotatably mounted in said frame and adapted to be moved in the path of said staple former and driver, and means carried by said anvil and controlled by said driver for clamping and releasing the severed wire in said anvil.

15. A wire stitching machine comprising a relatively narrow frame, a feeding mechanism mounted on said frame, a staple forming and driving mechanism mounted on said frame and operatively related to said feeding mechanism, whereby on the upward stroke of said staple former and driver the wire is fed downwardly by said feeding mechanism, a staple forming anvil rotatably mounted in said frame and adapted to be moved in the path of said staple former and driver, and spring actuated means carried by said anvil and controlled by said driver for clamping and releasing the wire held by said anvil.

16. A stitching machine comprising a frame, intermittently rotatable wire feeding rollers mounted on said frame, a clutch operatively connected with one of said rollers for driving said rollers in one direction, a pinion operatively connected with said clutch, reciprocating staple forming and driving mechanism mounted in said frame, a rack connected with said staple forming and driving mechanism and meshing with said pinion whereby on the upward stroke of said staple forming and driving mechanism the wire is fed downwardly, and severing means operatively connected with said staple forming and driving mechanism for severing the wire thus fed and at the conclusion of the feeding operation of said feeding mechanism.

17. A wire stitching machine comprising a frame, intermittently rotatable rollers mounted on said frame for feeding wire therebetween, reciprocating driving block mounted on said frame, a staple driver secured to said driving block, said block having a longitudinally extending bore therein, a reciprocating pin mounted in said bore, a staple former mounted in said frame and secured to said pin and means for locking said pin against movement with respect to said block whereby said former and driver move in unison to a predetermined position, and means for operatively connecting said reciprocating block to said rollers whereby the wire is fed downwardly by said rollers on the upward movement of said block.

18. A stitching machine comprising a frame, intermittently actuated rotatable rollers mounted on said frame for feeding the wire therebetween, a reciprocating driving block mounted in said frame, a staple driver secured to said frame, a reciprocating pin movable vertically in a bore located in said block, a spring mounted in the recess formed in the upper end of said pin for normally pressing said pin to its lowermost position with respect to said block, a staple former reciprocally mounted in said frame and rigidly connected to said pin, means for locking said reciprocating pin to said reciprocating block, a cam mounted on said frame and engageable with said locking pin for releasing said former from said block whereby said block may actuate said staple driver downwardly relative to said former, a severing means mounted on said frame, a reciprocating bar mounted on said frame and engageable with said block for actuating said severing means to cut the wire on the upward stroke of said block, and means for operatively connecting said block with said feed rollers for feeding the wire downwardly on the upward movement of said block.

19. A stitching machine comprising a frame, intermittently rotatable wire feed rollers mounted on said frame for feeding a wire downwardly in the direction of drive, a reciprocating block mounted in said frame, a staple driver secured to said block, a reciprocating pin mounted in a bore in said block, a spring mounted in the recess formed in said pin for normally pressing said pin to its lowermost position with respect to said block, a staple former secured to said pin and a locking member mounted in said block and engageable in a recess located in said pin for rigidly locking said staple former and driver together, camming means mounted on said frame and engageable with said locking member for locking said reciprocating pin with respect to said block, a cutter box mounted on said frame having a transverse movable cutter knife mounted therein, an actuating lever mounted in said frame having a portion thereof, adapted to engage said actuating member, a projection formed on said reciprocating block and engageable with said bar for actuating said knife, a rotatable staple forming anvil mounted on said frame for receiving a wire in a slot formed on the inner end thereof, a reciprocating bar mounted in said frame and engageable with said reciprocating block, and a connecting member connecting said anvil with said reciprocating bar for actuating said anvil by the movement of said reciprocating bar.

20. A wire stitching machine comprising a frame, intermittently rotatable feed rollers mounted on said frame for feeding the wire therebetween, a ratchet operatively related to one of said rollers for actuating said rollers in one direction, a reciprocating block mounted in said frame, a staple driver secured to said block, a reciprocating pin mounted in the bore in said block, a staple former secured to said pin, means for locking said pin against movement with respect to said block, means for unlocking said pin from said block whereby said staple driver may move relatively to said staple former, a rack secured to said block, and a clutch mechanism carried by one of said feed rollers whereby on the upward stroke of said block the wire is fed downwardly and on the downward stroke of said block said clutch permits said feed rollers to remain stationary.

21. A wire stitcher comprising the mechanism for feeding wire in a direction parallel to the direction of the drive, a wire feeding mechanism, a staple forming and driving mechanism, and means for feeding the wire thereto during the non-working stroke of said staple forming and driving mechanism.

22. A wire stitcher comprising intermittently actuated rollers for feeding the wire parallel to the direction of drive, wire severing means, staple forming and driving means, and means operatively connecting said staple forming and driving means with said roller for feeding the wire downwardly on the upward non-working stroke of said staple forming and driving mechanism.

In testimony whereof we have signed our names to this specification on this 2nd day of Oct., A. D. 1928.

IRVING R. METCALF.
GEORGE L. RICHARDSON.
JOHN WOLF.